(12) United States Patent
Lee

(10) Patent No.: US 10,551,084 B2
(45) Date of Patent: Feb. 4, 2020

(54) AIR CONDITIONER

(71) Applicant: LG ELECTRONICS INC., Seoul (KR)

(72) Inventor: Kwonhyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 15/920,605

(22) Filed: Mar. 14, 2018

(65) Prior Publication Data
US 2018/0266720 A1 Sep. 20, 2018

(30) Foreign Application Priority Data

Mar. 14, 2017 (KR) .......................... 10-2017-0032015

(51) Int. Cl.
*F24F 11/65* (2018.01)
*F24F 11/56* (2018.01)
(Continued)

(52) U.S. Cl.
CPC ................ *F24F 11/65* (2018.01); *F24F 1/46* (2013.01); *F24F 11/49* (2018.01); *F24F 11/56* (2018.01);
(Continued)

(58) Field of Classification Search
CPC .... F24F 11/65; F24F 1/46; F24F 11/49; F24F 11/56; F24F 2221/16; G05B 15/02; H04W 4/80; H04B 1/40
See application file for complete search history.

(56) References Cited

U.S. PATENT DOCUMENTS

| 5,224,648 A * | 7/1993 | Simon ...................... F24F 11/00 |
| | | 236/51 |
| 5,711,480 A * | 1/1998 | Zepke ................ G05D 23/1905 |
| | | 236/51 |

(Continued)

FOREIGN PATENT DOCUMENTS

| EP | 2 369 247 | 9/2011 |
| EP | 2 881 676 | 6/2015 |

(Continued)

OTHER PUBLICATIONS

P. Vlach, B. Segal, J. LeBel and T. Pavlasek, "Cross-floor signal propagation inside a contemporary ferro-concrete building at 434, 862, and 1705 MHz," in IEEE Transactions on Antennas and Propagation, vol. 47, No. 7, pp. 1230-1232, Jul. 1999.*

(Continued)

Primary Examiner — Christopher E. Everett
(74) Attorney, Agent, or Firm — KED & Associates LLP

(57) ABSTRACT

An air conditioner is provided that may include a plurality of units including an outdoor unit and an indoor unit, the plurality of units being distributed at a plurality of layers or levels or stories in a building; and a controller configured to monitor and control the plurality of units. The controller and the plurality of units may include a communication unit configured to transmit/receive data in a wireless communication unit, respectively, and the communication unit may transmit/receive the data using a sub-giga band frequency. The plurality of units may transmit/receive data in a wireless communication scheme so that an indoor unit and an indoor unit, and an indoor unit and an outdoor unit may directly communicate with each other in a wireless scheme, and the indoor unit may directly communicate with the controller.

18 Claims, 7 Drawing Sheets

(51) Int. Cl.
*F24F 11/49* (2018.01)
*F24F 1/46* (2011.01)
*G05B 15/02* (2006.01)
*H04W 4/80* (2018.01)
*H04B 1/40* (2015.01)

(52) U.S. Cl.
CPC .......... *G05B 15/02* (2013.01); *F24F 2221/16* (2013.01); *H04B 1/40* (2013.01); *H04W 4/80* (2018.02)

(56) References Cited

U.S. PATENT DOCUMENTS

| | | | |
|---|---|---|---|
| 5,839,654 A | 11/1998 | Weber | |
| 6,072,994 A * | 6/2000 | Phillips | G01S 13/767 375/219 |
| 2004/0223477 A1* | 11/2004 | Iwasaki | H04W 48/16 370/338 |
| 2004/0261432 A1* | 12/2004 | Yamamoto | F24F 11/30 62/132 |
| 2006/0090483 A1* | 5/2006 | Kim | F24F 11/30 62/126 |
| 2007/0063914 A1* | 3/2007 | Becker | A62C 35/60 343/840 |
| 2009/0204265 A1* | 8/2009 | Hackett | G05B 19/4185 700/284 |
| 2010/0109842 A1* | 5/2010 | Patel | G01C 21/206 340/10.1 |
| 2010/0137012 A1* | 6/2010 | Kurten | H04W 40/12 455/500 |
| 2010/0177660 A1* | 7/2010 | Essinger | H04W 4/50 370/254 |
| 2011/0076963 A1* | 3/2011 | Hatano | G06F 1/1698 455/68 |
| 2011/0077758 A1* | 3/2011 | Tran | G16H 40/67 700/94 |
| 2011/0111700 A1* | 5/2011 | Hackett | A01G 25/16 455/41.2 |
| 2011/0127341 A1* | 6/2011 | Kaneoya | G05D 23/1935 236/46 A |
| 2011/0219798 A1* | 9/2011 | Kim | F24F 1/0003 62/129 |
| 2012/0248207 A1* | 10/2012 | Drake | G05D 23/1931 236/51 |
| 2012/0253521 A1* | 10/2012 | Storm | G05D 23/1905 700/276 |
| 2013/0024029 A1* | 1/2013 | Tran | A61B 5/1113 700/278 |
| 2013/0298576 A1* | 11/2013 | Kim | F24F 1/0003 62/56 |
| 2013/0343433 A1* | 12/2013 | Yang | H04B 1/707 375/146 |
| 2014/0135998 A1 | 5/2014 | Cao et al. | |
| 2014/0203090 A1 | 7/2014 | Edwards et al. | |
| 2015/0108901 A1* | 4/2015 | Greene | H05B 37/0218 315/149 |
| 2015/0250008 A1 | 9/2015 | Kratz | |
| 2015/0323207 A1* | 11/2015 | Son | F24F 13/04 700/276 |
| 2016/0216879 A1 | 7/2016 | Park et al. | |
| 2017/0027043 A1* | 1/2017 | Greene | H03K 17/962 |

FOREIGN PATENT DOCUMENTS

| | | |
|---|---|---|
| EP | 2 944 887 | 11/2015 |
| JP | 2001-153436 | 6/2001 |
| JP | 4380594 | 10/2009 |
| KR | 10-2004-0045868 | 6/2004 |
| KR | 10-2014-0046713 | 4/2014 |
| KR | 10-2014-0131749 | 11/2014 |
| KR | 10-2016-0004712 | 1/2016 |
| WO | WO 2013/169750 | 11/2013 |
| WO | WO 2016/032239 | 3/2016 |

OTHER PUBLICATIONS

European Search Report dated Jul. 23, 2018.
International Search Report dated Jul. 24, 2018.

\* cited by examiner

AIR CONDITIONER

CROSS-REFERENCE TO RELATED APPLICATION(S)

This application claims the priority benefit of Korean Patent Application No. 10-2017-032015, filed on Mar. 14, 2017 in the Korean Intellectual Property Office, the disclosure of which is incorporated herein by reference.

BACKGROUND

1. Field

An air-conditioner is disclosed herein.

2. Background

An air conditioner is installed to provide a more pleasant indoor environment to people by discharging cold air to adjust an indoor temperature and to clean indoor air in order to configure a pleasant indoor environment. In general, the air conditioner includes an indoor unit configured by a heat exchanger installed at an inside and an outdoor unit configured by a compressor and a heat exchanger to supply refrigerant to the indoor unit.

In the air conditioner, the indoor unit configured by a heat exchanger and the outdoor unit configured by a compressor are separately controlled. The outdoor unit is connected with the indoor unit through a refrigerant pipe to supply refrigerant compressed from the compressor of the outdoor unit to the heat exchanger of the indoor unit through the refrigerant pipe. The heat-exchanged refrigerant from the heat exchanger of the indoor unit is again introduced into a compressor of the outdoor unit through the refrigerant pipe. Accordingly, the indoor unit introduces cold air into an inside through heat exchange using the refrigerant.

Air conditioners are connected with each other in a building unit or a small group unit to transmit/receive data, and monitor and control the state of each unit through the transmitted/received data. In the air conditioner, respective units are connected with each other by a communication line to use a wired communication scheme. According to a connection structure of the communication line, the indoor unit transmits data to the outdoor unit and the outdoor unit receives the data from the indoor unit to transmit the received data to a control unit.

In such a communication structure, the indoor unit cannot directly communicate with the control unit but should communicate with the control unit through the outdoor unit. As the outdoor unit processes a plurality of data from the indoor unit to sequentially communicate with the control unit, delay occurs so that the indoor unit cannot rapidly process the data.

Japanese Patent Application No. 438059469, which is hereby incorporated by reference, describes that an antenna for wireless communication is provided so that an indoor unit communicates in a wireless scheme. However, in Japanese Patent Application No. 438059469, in order to communicate a user terminal with an indoor unit in a wireless scheme, an indoor unit and an indoor unit, an indoor unit and an outdoor unit, and an indoor unit and a control unit are connected with each other through a communication line so that the respective units communicate with each other in a wired scheme. When units communicate with each other in a wireless scheme, the communication may be easily performed on one layer. However, in a building higher than five layers or levels or stories, there is a limitation to transfer signals so that communication is difficult. In particular, in a general environment where the outdoor unit is installed in the basement, there is a limitation in wireless communication due to a distance between the outdoor unit and the indoor unit. Further, due to obstacles such as walls or bottoms (or floors) in a building, a signal is attenuated so that a quality of signals is degraded, thereby deteriorating stability of the communication.

BRIEF DESCRIPTION OF THE DRAWINGS

Embodiments will be described in detail with reference to the following drawings in which like reference numerals refer to like elements, and wherein.

DETAILED DESCRIPTION

Figure 1:
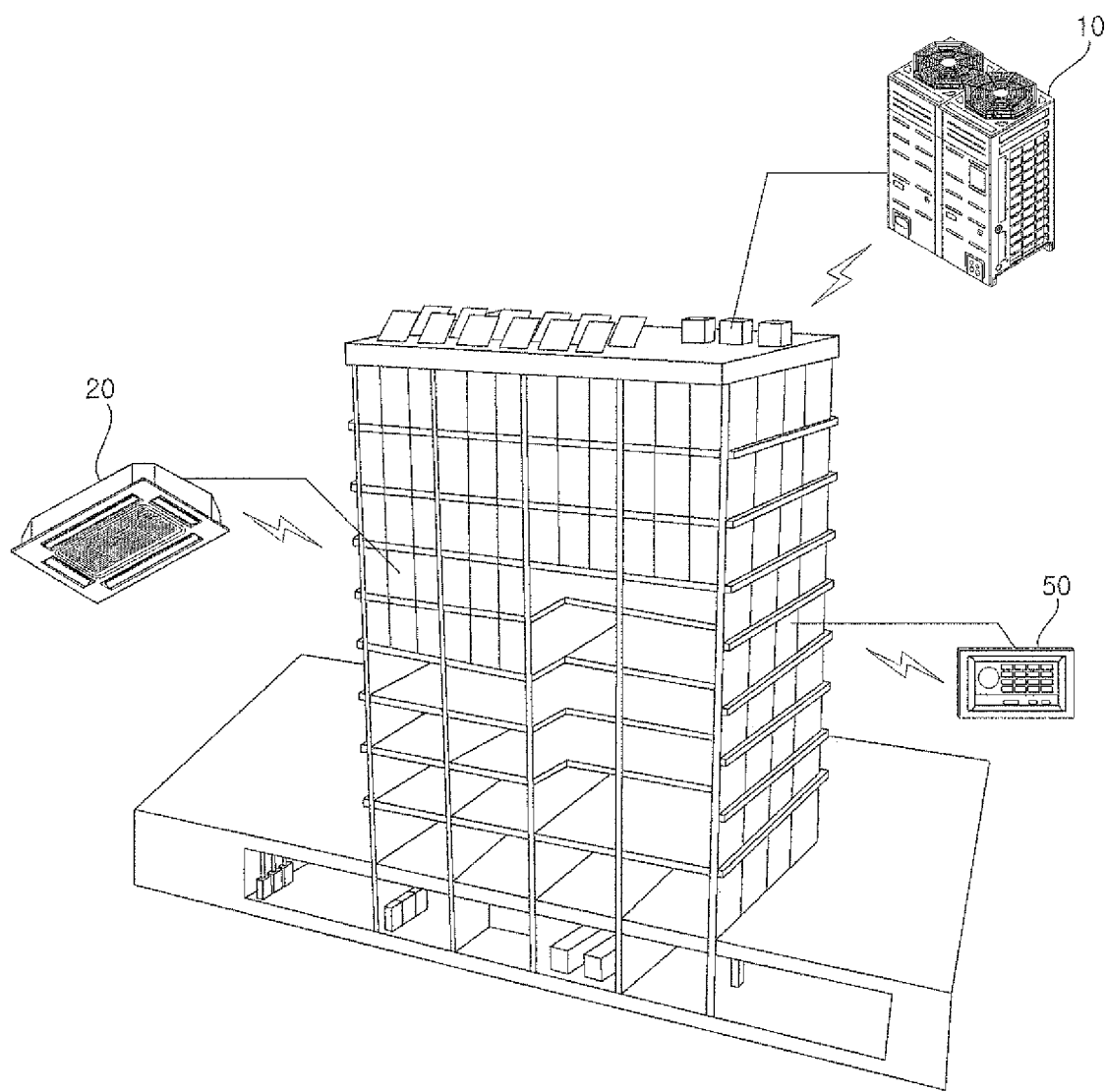
FIG. 1 is a view schematically showing a configuration of an air conditioner installed at a building according to an embodiment.

The advantages, the features, and schemes of achieving the advantages and features of the disclosure will be apparently comprehended by those skilled in the art based on embodiments, which are described hereinafter. However, the embodiments are not limited to following disclosed embodiments but may be implemented in various different forms. The embodiments complete the disclosure to be provided to a person having ordinary skill in the art to which the invention pertains in order to inform a spirit and scope. The embodiments are defined by the scope of claims. Like reference numerals designate like elements throughout the specification. Further, in the embodiments, a configuration of a control unit and each unit may be implemented by one or more processor or by a hardware device.

Embodiments will be described with reference to the accompanying drawings. Wherever possible, like reference numerals have been used to indicate like elements, and repetitive disclosure has been omitted.

FIG. 1 is a view schematically showing a configuration of an air conditioner installed at a building according to an embodiment. As shown in FIG. 1, the air conditioner includes an outdoor unit 10, an indoor unit 20, and a control device or controller 50. The air conditioner may include a ventilation system, an air cleaner, a humidifier, and a heater as well as the indoor unit and the outdoor unit, and may further include units, such as a chiller, an air conditioning unit, and a cooling unit according to scale. In the air conditioner, respective units may be connected with each other to be operated in connection with operations of the indoor unit and the outdoor unit. Further, the air conditioner may be connected with a moving device, a security device, and an alarm device in the building to be operated.

The control device 50 may control operations of the indoor unit 20 and the outdoor unit 10 corresponding to an input user command, periodically receive and store corresponding data with respect to operation states of the indoor unit and the outdoor unit, and output the operation states through a monitoring screen. The control device 50 may be connected with the indoor unit 20 to perform, for example, operation setting, lock setting, schedule control, group control with respect to the indoor unit, and peak control and demand control with respect to power use.

The outdoor 10 may be connected to the indoor unit 20 through a refrigerant pipe to supply a refrigerant to the indoor unit 20. Further, the outdoor unit 10 may periodically communicate with a plurality of indoor units to transmit/receive data from each other, and an operation of the outdoor unit 10 may be changed according to a changed operation setting.

The indoor unit 20 may include an electronic expansion valve (not shown) configured to expand a refrigerant supplied from the outdoor unit 10, an indoor heat exchanger (not shown) configured to heat-exchange a refrigerant, an indoor unit fan (not shown) configured to introduce indoor air into the indoor heat exchanger and to expose the heat-exchanged air to an inside, a plurality of sensors (not shown), and a control means or controller (not shown) configured to control an operation of an indoor unit. Moreover, the indoor unit 20 may include an outlet (not shown) configured to discharge heat-exchanged air, and a wind direction control unit or controller (not shown) may be provided at an outlet to open/close the outlet and to control a direction of the discharged air. The indoor unit 20 may control suctioned air, discharged air, a wind direction by controlling a rotational speed of an indoor unit fan. The indoor unit 20 may further include an input unit or input configured to an operation state and setting information of an indoor unit and an input unit or input configured to input setting data. In this case, the indoor unit 20 may transmit setting information on an operation of the air conditioner to a remote control unit or controller (not shown) which allows the remote control unit to output the setting information and to receive data.

The outdoor unit 10 may be operated in a cooling mode and a heating mode according to data received from the connected indoor unit 20 or a control command from the control unit to supply a refrigerant to a connected indoor unit 20.

When a plurality of outdoor units is connected, outdoor units may be connected to a plurality of indoor units, and may supply the refrigerant to the plurality of indoor units through a distributor.

The outdoor unit 10 may include at least one compressor configured to compress a refrigerant to discharge gaseous refrigerant of high pressure, an accumulator configured to separate gaseous refrigerant and liquid refrigerant from the refrigerant to prevent non-gasified liquid refrigerant from be introduced into the compressor, an oil recovering device configured to recover oil from the refrigerant discharged from the compressor, an outdoor heat exchanger configured to condense or evaporate the refrigerant by heat exchange with an external air, an outdoor fan configured to introduce air into the outdoor heat exchanger and to discharge the heat exchanged air to an outside in order to easily perform heat exchange with the outdoor heat exchanger, a four-way valve configured to change a fluid path of the refrigerant according to an operation mode of the outdoor unit, at least one pressure sensor configured to measure pressure, at least one temperature sensor configured to measure a temperature, and a control configuration configured to control an operation of an outdoor unit and to perform communication with another unit. Although the outdoor unit 10 further may include a plurality of sensors, valves, and sub-coolers, a detailed description thereof is omitted.

Further, the air conditioner may exchange with other air conditioners through a network, such as the Internet. The air conditioner may access an external service center, a management server, and a database through a control unit or controller, and may communicate with an external terminal through a network. A terminal may access the air conditioner to monitor and control an operation of the air conditioner by a second control unit or controller.

Figure 2:
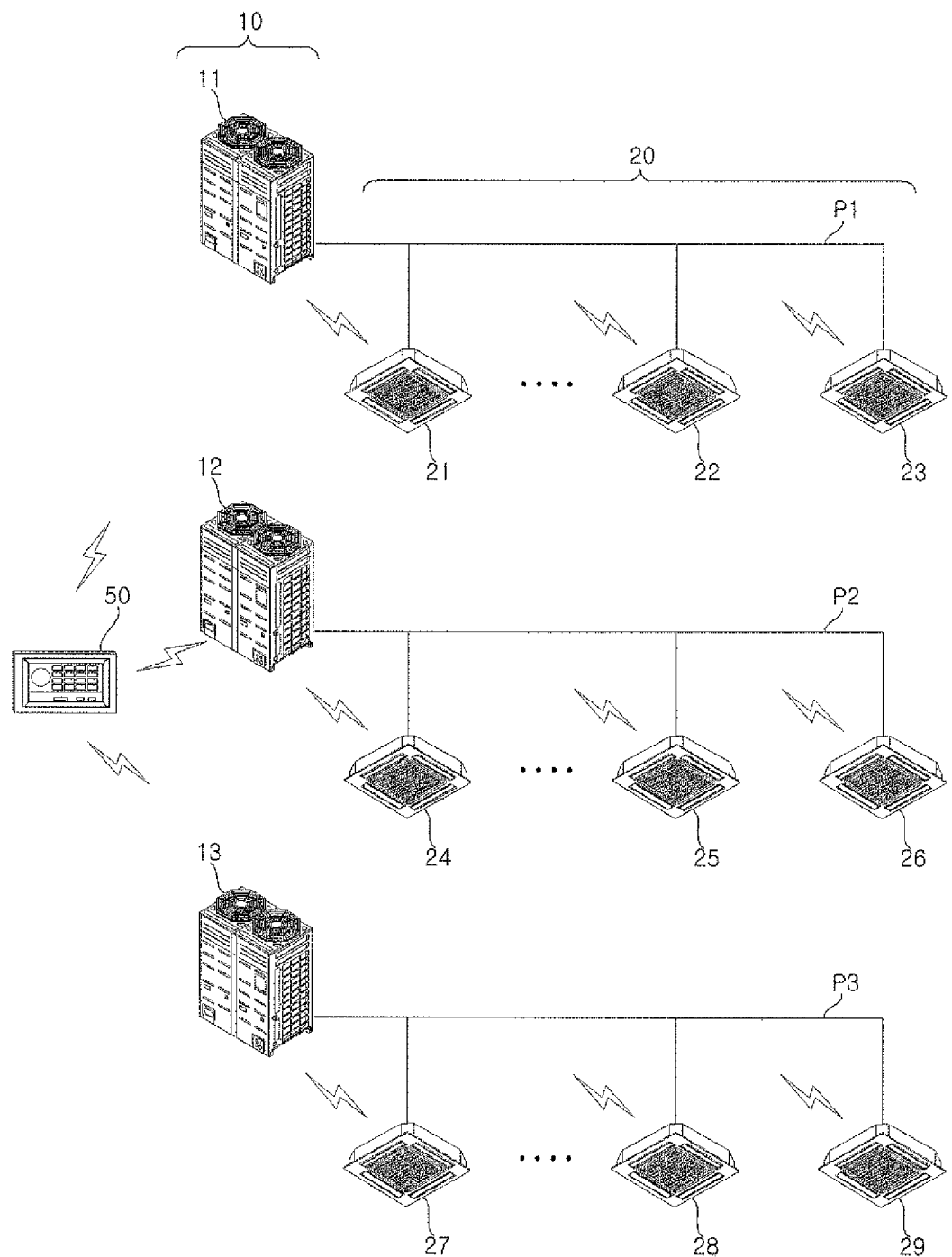
FIG. 2 is a view illustrating a configuration of an air conditioner according to an embodiment.

FIG. 2 is a view illustrating a configuration of an air conditioner according to an embodiment. As shown in FIG. 2, in an air conditioner, the plurality of indoor units 20, the plurality of outdoor units 10, and control device 50 transmit/receive data in a wireless communication scheme. The air conditioner may further include a repeater (not shown) configured to transfer signals as necessary.

The first outdoor unit 10 may be connected with first to third indoor units 21 to 23 through a first refrigerant pipe P1. The second outdoor unit 12 may be connected with four to sixth indoor units 23 to 26 through a second refrigerant pipe P2. The third outdoor unit 13 may be connected with seventh to ninth indoor units 27 to 29 through a third refrigerant pipe P3. Although the embodiment was described with three indoor units connected with each outdoor unit for the purpose of convenience or clarity and for illustrative purpose only, a number of indoor units or a shape of the indoor unit is not limited.

When the first outdoor unit 11 is operated, the refrigerant is supplied to the first to third indoor units 21 to 23. The refrigerant is supplied to the fourth to sixth indoor units 23 to 26 through the second refrigerant pipe P2 by an operation of the second outdoor unit 12. The refrigerant is supplied to the seventh to ninth indoor units 27 to 29 from the third indoor unit 13 through the third refrigerant unit P3.

The outdoor unit 10 is connected to a plurality of indoor units through the refrigerant pipes P1, P2, and P3 to transmits/receive data in a wireless communication scheme. The outdoor unit 10 periodically communicates with a plurality of indoor units 20 to transmit/receive data to and from each other, and an operation is changed according to a changed operation setting from the indoor unit. A plurality of outdoor units and a plurality of indoor units transmit/receive data in a wireless communication scheme. The indoor unit 20 communicates with the outdoor unit 10 and communicates with the control device 50 in a wireless communication scheme.

As described above, as the indoor unit performs heat exchange based on the refrigerant supplied from the outdoor unit to discharge cold and hot air, the indoor unit and the outdoor unit may be configured as one group. In the air conditioner, the group may be configured based on an outdoor unit, and each group communicates using different channels.

For example, the first outdoor unit 11 may form a first group together with the first to third indoor units 21 to 23 through the first refrigerant pipe P1. The second outdoor 12 may form a second group together with fourth to sixth indoor units 24 to 26 connected with each other through the second refrigerant pipe P2. The third outdoor 13 may form a third group together with seventh to ninth indoor units 24 to 26 connected with each other through the third refrigerant pipe P3. Further, the outdoor and the control unit may be configured according to an installation position. A connection state by the refrigerant pipe may be distinguished based on whether a temperature of an indoor unit is changed according to supply of a refrigerant of the outdoor unit by operating the outdoor unit and the indoor unit.

The control device 50 may communicate with the indoor unit 20 or the outdoor unit 10 regardless of a group. The control device 50 may control operation of the plurality of indoor units 20 and outdoors units 10 according to an input user command, periodically receive and store corresponding data with respect to operation states of the plurality of indoor units and outdoor units, and output the operation states on a monitor screen.

The control device 50 may be connected to the plurality of indoor unit 20 to perform, for example, operating setting, lock setting, schedule control, group control, and group control with respect to the indoor unit, and peak control and demand control with respect to power use. Further, when a plurality of control unit is provided, the control units may transmit/receive data through a wireless communication, and may connect with an external control unit through an external network. A plurality of units and control units may communicate with each other in one-to-one correspondence. When the plurality of units and control units are spaced apart from each other by a predetermined distance, the plurality of units and control units may transfer signals through a repeater.

Figure 3:
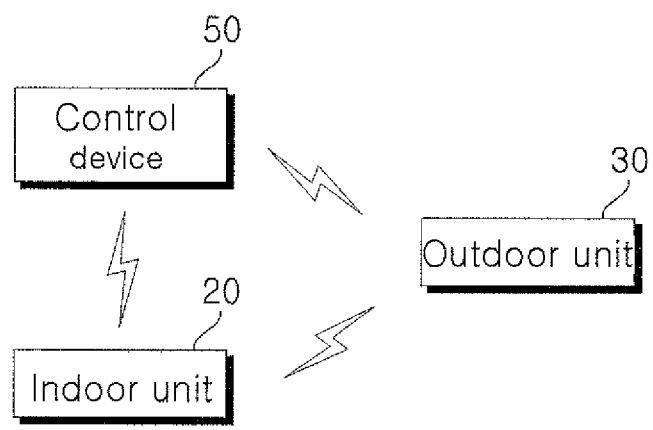
FIG. 3 is a block diagram illustrating communication of units of the air conditioner according to an embodiment.

FIG. 3 is a block diagram illustrating communication of units of the air conditioner according to an embodiment. As shown in FIG. 3, the outdoor unit 10, the indoor unit 20, and the control device 50 may transmit/receive data in a wireless communication scheme.

As described above, the previous embodiment has described that a group is configured between the outdoor unit and an indoor unit by taking into consideration a flow of the refrigerant. Not only a communication channel between the outdoor unit and the indoor unit but also a communication channel including the control unit, the outdoor unit, and the indoor unit may be separately configured.

The control device 50 may make requests to the outdoor unit 10 and the indoor unit 20, and determine an operation state of each unit based on the data received from the outdoor unit 10 and the indoor unit 20 to determine a presence of failure. The control device 50 may change operation setting of an indoor unit 20 according to a state (temperature or humidity) of an indoor space in which the indoor unit 20 is installed and change an operation of the outdoor unit when operation setting of the indoor unit is changed.

When a schedule is set so that the indoor unit 20 performs a preset or predetermined operation at a designated time, the control device 50 may transmit an operation command to the indoor unit 20 and an outdoor unit 10 connected with the indoor unit 20. The indoor unit 20 may transmit a corresponding response to the control device 50 and transmit data with respect to an operation state at a predetermined time interval.

The indoor unit 20 may set an operation to transmit data to the outdoor unit 10 according to data received from the input unit or data received from the control device 50. The outdoor unit 10 may calculate the received data of the indoor unit 20 and a load according to an operation state of a plurality of indoor units to control a compressor.

The outdoor unit 10 or the indoor unit 20 may transmit data to the control device 50 at a predetermined time interval. When breakage or failure occurs, the outdoor unit 10 or the indoor unit 20 may transmit data with respect to the breakage or the failure.

Figure 4:
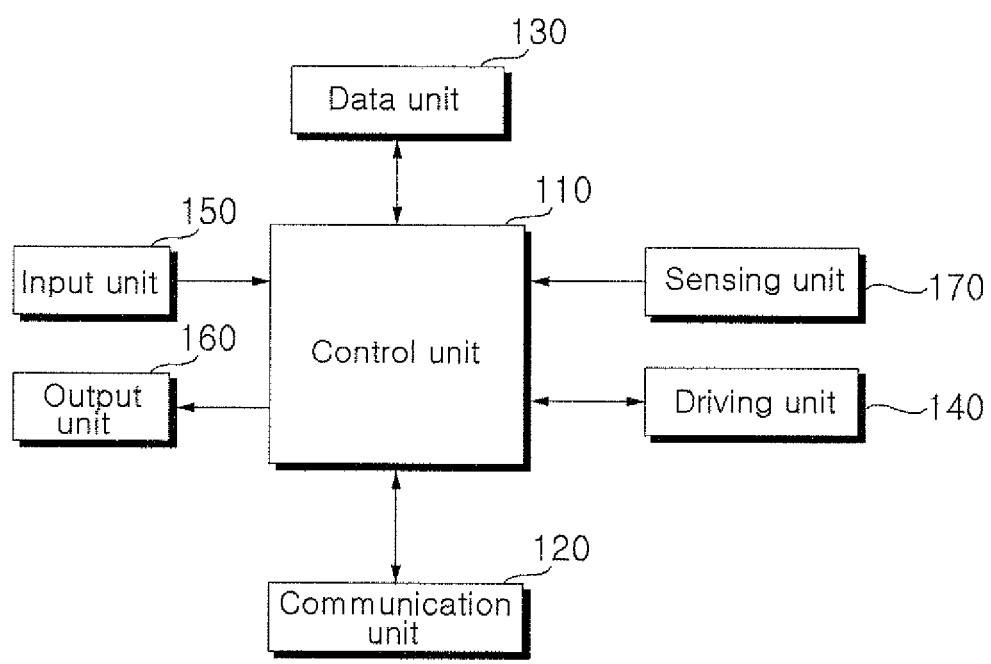
FIG. 4 is a block diagram schematically illustrating a control configuration of units of the air conditioner according to an embodiment.

FIG. 4 is a block diagram schematically illustrating a control configuration of units of the air conditioner according to an embodiment. As shown in FIG. 4, a unit of the air conditioner may include a drive unit or drive 140, a sensing unit or sensor 170, a communication unit 120, an output unit or output 160, an input unit or input 150, a data unit or storage 130, and a control unit or controller 110 configured to control an overall operation. The above is a configuration included in each unit in common and a separate configuration may be added according to a characteristic of a product.

For example, the outdoor unit 10 may include a compressor, an outdoor unit fan, and a plurality of valves. Accordingly, the drive unit of the outdoor unit may include a compressor driver, an outdoor fan driver, and a valve controller. The indoor unit 20 may include a louver or a vane as a wind direction controller. The indoor unit 20 may include a plurality of valves, an indoor unit fan driver, a valve controller, and a wind direction controller. Further, according to a type of the unit, types, a number, and installation positions of a sensor included in the sensing unit may be changed.

The data unit 103 may store, for example, control data for controlling an operation of the unit, communication data with respect to an address or group setting for communicating with another unit, data transmitted/received to/from the outside, and operation data generated or sensed during the operation. The data unit 130 may store an execution program by function of the unit, data for controlling the operation, and transmitted/received data. The data unit 103 may include various storage devices, such as ROM, RAM, EPROM, a flash driver, and a hard driver in a hardware scheme, for example.

The input unit 150 may include at least one of buttons, switches, or a touch input means, for example. When a user command or predetermined data corresponding to operation of an input means is input to the input unit 150, the input unit 150 may provide the input data to the control unit 110. A power key, a trial run key, and an address setting key may be provided in the outdoor unit, for example. A power key, a menu input key, an operation setting key, a temperature control key, a wind direction key, and a lock key, for example, may be provided in the indoor unit.

The output unit 160 may include at least one of a lamp lighting or blinking of which is controlled, a speaker, and a display, for example, to output an operation state of the unit. The lamp may output whether a unit is operated according to a presence of lighting, a lighting color, and a presence of blinking. The speaker may output a predetermined warning sound and a sound effect to output an operation state. The display may output a menu screen for controlling a unit, and may output an operation setting or an operation state of the unit with a guide message or warning configured by at least one combination of characters, numbers, and images.

The sensing unit 170 may include a plurality of sensors. The sensing unit 170 may include a pressure sensor, a temperature sensor, a gas sensor, a humidity sensor, and a flow sensor, for example.

For example, a plurality of temperature sensors may be provided and detect and input an indoor temperature, an outdoor temperature, an indoor heat exchanger temperature, an outdoor heat exchanger, and a pipe temperature to the control unit 110, for example. The pressure sensors may be installed at an input port and an output port of the refrigerant pipe to measure and input pressure of an introduced refrigerant and pressure of a discharged refrigerant to the control unit 110. The pressure sensor may be installed at a water pipe as well as the refrigerant pipe.

The drive unit 140 may supply operation power to a control target according to a control command from the control unit 110 to control the drive of the control target. As described above, in a case of the outdoor unit, the drive unit 140 may separately include, for example, a compressor driver, an outdoor fan driver, and a valve controller configured to control a compressor, an outdoor fan, and a valve, respectively. The drive unit 140 may provide an operation power to motors included in a compressor, an outdoor unit fan, and a valve which allows the compressor, the outdoor unit fan, and the valve to perform a designated operation according to operation of the motors.

The communication unit 120 may include at least one wireless communication module to communicate with another unit according to a control command from the control unit 110. The communication unit 120 may transmit/receive data between the control unit 110, the outdoor unit, and the indoor unit in a wireless communication scheme and provide received data to the control unit 110.

The communication unit 220 may include a plurality of communication modules to communicate with during between the outdoor unit and another indoor unit, between the outdoor unit and a remote controller, and between the outdoor unit and the control unit 110 through the same or different communication modules. The communication unit 120 may communicate in different communication schemes according to a target by selectively changing a communication scheme corresponding to a communicating target. When a different channel is used in communication with the indoor unit and the control unit, the communication unit 120 may configure a channel according to the communicating target to transmit/receive data.

The communication unit 120 may communicate using a frequency of sub-giga (GHz) band having excellent transmission and diffraction characteristics by taking into consideration an attenuation effect of a wireless signal due to a wall in a building and an inter-layer obstacle. The communication unit 120 may communicate using one of a 400 MHz band or a 900 MHz band which are unlicensed bands available for a specific small-power radio station. The communication unit 120 may selectively use a 400 MHz band frequency and a 900 MHz band frequency corresponding to different rules according to a zone or a country. Further, the communication unit 120 may further include a short range communication module, such as a ZigBee module, a Bluetooth module, and a Near Field Communication (NFC) module, for example.

The control unit 110 may control data input and output through the input unit 150 and the output unit 160, manage data stored in the data unit 130, and control transmission/reception of the data through the communication unit 120. The control unit 110 may generate a control command according to a request from another unit or operation setting to provide the control command to the drive unit 140. Accordingly, the drive unit 140 allows connected configurations, for example, a compressor, an outdoor fan, valves, an indoor unit fan, and a wind direction controller to be operated. Further, the control unit 110 determines an operation state according to data input from a plurality of sensors of the sensing unit 170 to determine a presence of failure and to output an error.

Figure 5:
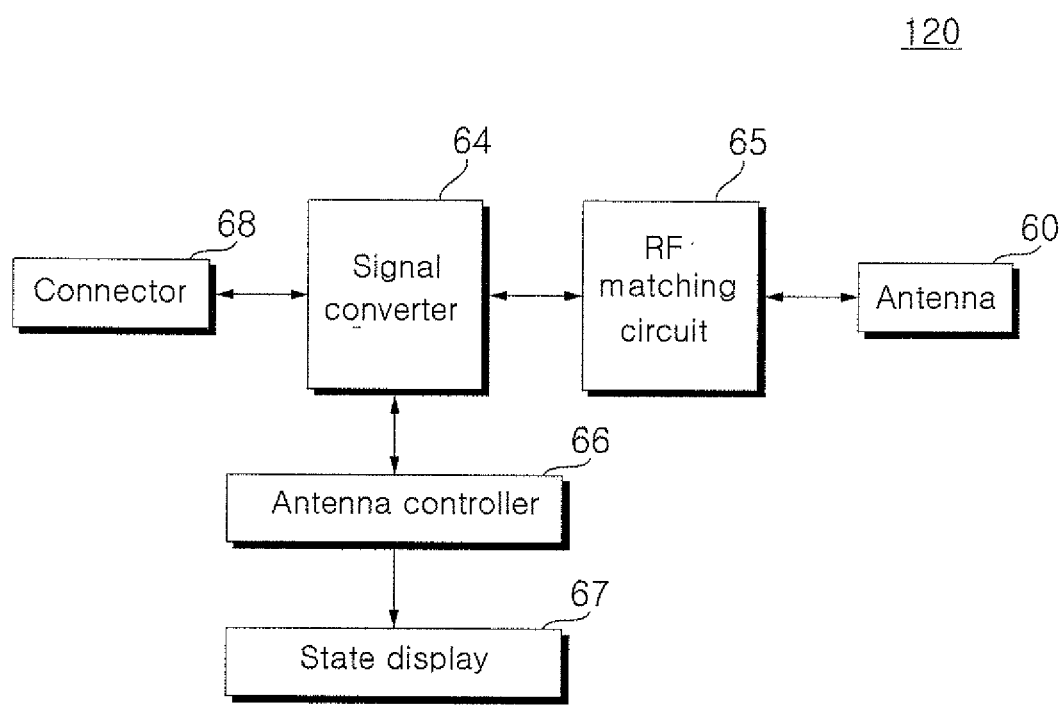
FIG. 5 is a block diagram schematically illustrating a configuration of a communication module for wireless communication in an air conditioner according to an embodiment.

FIG. 5 is a block diagram schematically illustrating a configuration of a communication module for wireless communication in an air conditioner according to an embodiment. As shown in FIG. 5, the communication unit 120 may include an antenna 60, an RF matching circuit 65, a signal converter 64, an antenna controller 66, a state display 67, and a connector 68.

The antenna 60 may selectively use a frequency band used from a 400 MHz band or a 900 MHz band being a sub-giga band. A shape of the antenna 60 may be changed according to a used frequency band.

The antenna 60 may transmit a signal output from the RF matching circuit 65 in air and receive and provide a signal of a frequency band designated in air the RF matching circuit 65. The RF matching circuit 65 may control an output of a signal to be transmitted. The RF matching circuit 65 may control the output of the signal by controlling output impedance, that is, impedance of the antenna 60 to have a preset or predetermined value. The RF matching circuit 65 may control impedance suited to a frequency band to be transmitted and received through the antenna 60.

As the communication unit 120 uses the sub-giga band of the 400 MHz band or the 900 MHz band, the RF matching circuit 65 may perform impedance matching according to the used frequency band.

The signal converter 64 may convert a signal from the unit according to the control command from the antenna controller 66 to provide the converted signal to the RF matching circuit 65, and convert a received signal to provide the converted signal to the antenna controller 66.

The connector 68 may connect the unit with the communication unit 120. The connector 68 may include a connection terminal coupled with a transmission/reception port included in the unit. The connector 68 may provide a signal from the unit to the signal converter 64, and transfer the signal converted from the signal converter 64 to the control unit 110 of the unit.

The antenna controller 66 may control the RF matching circuit and the signal converter to transmit a signal of a designated frequency band as an output in which data of the unit are set. Moreover, the antenna controller 66 may process and provide the received data to the unit. In addition, the antenna controller 66 may control data to be converted into a designated form according to a used communication scheme.

The antenna controller 66 may confirm a communication state of a connected network and determine whether communication is possible to output a determination result through the state display 67. When the communication fails, the antenna controller 66 may allow the state display 67 to output a corresponding warning. Moreover, the antenna controller 66 may transmit communication failure to the unit through the connector 68.

When a communication channel is configured in communication between units, the antenna controller 66 may control data to be transmitted/received through a designated channel. The state display 67 may output an operation state, a network connection state, and transmission/reception states of data of the communication unit 120.

Figure 6A:
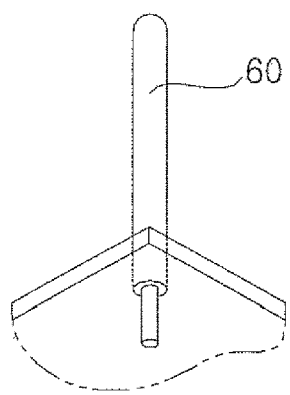
FIGS. 6A-6C are views illustrating a unit of an air conditioner according to an embodiment.
Figure 6B:
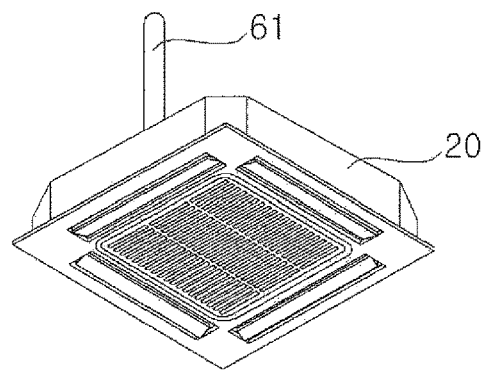
Figure 6C:
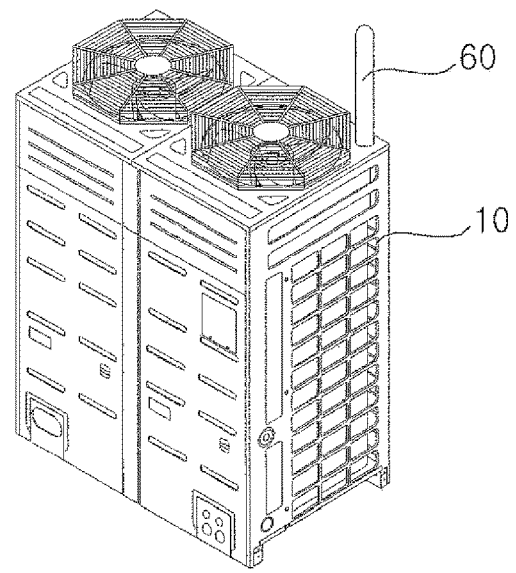

FIGS. 6A-6C are views illustrating a unit of an air conditioner according to an embodiment. In the air conditioner, a plurality of units exchange data with each other in a wireless communication scheme.

The plurality of units is not installed at a single layer. However, as shown in FIG. 1, the plurality of units is installed at a plurality of layers or levels or stories (of a building to transmit/receive data.

As described above, accordingly, as there are obstacles such as an inter-layer wall or furniture, there is a need to use a frequency band which may pass through the obstacles in a building and reach greater than a predetermined distance.

As shown in FIG. 6A, the unit may include antenna 60 for wireless communication. In particular, the unit of the air condition may include an external antenna rather than a built-in antenna in order to transmit/receive a wireless signal because there are a plurality of cases made of iron. Moreover, the antenna 60 may include an omnidirectional antenna. Installation positions of an indoor unit and an outdoor unit being units of the air conditioner are not designated. The installation positions of the indoor unit and the outdoor unit may be changed according to a shape, a structure, and use purpose of the building. Accordingly, as a position of a target to communicate with is variously changed, the antenna 60 may use the omnidirectional antenna instead of a directional antenna having radiation and reception patterns set in a specific direction.

There is a demand to set a length of the antenna 60 according to a transmission frequency by taking into consideration an installation environment. For example, in a case of a ceiling type indoor unit, when a length of the antenna is too long, a possibility of the installation of the antenna may be depend on a size of an inner space of a ceiling. Accordingly, a helical antenna may be used in order to minimize a length of the antenna.

Further, the smaller a transmission frequency is, a length of the antenna may be greater so that a frequency should be set among available frequency bands by taking into consideration the length of the antenna. The length of the antenna may be $\lambda/2$ or $\lambda/4$ of a transmission frequency.

For example, when the transmission frequency is 447 MHz, a wavelength of the antenna may be 0.67 m. If the $\lambda/2$ is applied to the transmission frequency, the length of the antenna may be 0.34 m. If the $\lambda/4$ is applied to the transmission frequency, the length of the antenna may be 0.17 m.

The wavelength may be 0.12 m if the transmission frequency is 2.4 GHZ. Accordingly, when the transmission frequency is $\lambda/2$, the length of the antenna may be 0.06 m. When the transmission frequency is $\lambda/4$, the length of the antenna may be 0.03 m.

A signal of a 2.4 GHz band may be used by taking into consideration the length of the antenna. However, in a case of Wi-Fi or Bluetooth technology using a 2.4 GHz ISM band for a wireless network in a building, a radio wave of the 2.4 GHz band is easily reflected or diffracted by obstacles such as a bottom or floor, a window, a wall, or a partition, and there is a limitation in a reach distance in the building. Further, as the 2.4 GHz band does not require a separate use license of a frequency, a wireless device is increasingly used so that interference between devices becomes a problem.

A case of ISM bands (100 MHz, 200 MHz, 400 MHz, and 900 MHz) among the sub-giga bands has an excellent transmission characteristic in the building so that inter-layer communication is possible. However, there is a limitation in using the frequency band by country, so the above may be taken into consideration. In Korea, 170 MHz, 200 MHz, 300 MHz, and 400 MHz band channels are assigned as a frequency band for data transmission in a small output wireless device.

As the length of the antenna 60 is determined according to a band of a transmission frequency, an antenna is long in a case of a 100 MHz band or a 200 MHz band so that there is a limitation in installation. Accordingly, the air conditioner according to embodiments may communicate using a 400 MHz frequency band or a 900 MHz frequency band among the above frequency bands by taking into inter-layer communication and the length of the antenna. According to Korean radio regulations, with respect to the 400 MHz frequency band or the 900 MHz frequency band, there are 21 channels from 424.7 MHz to 424.95 MHz and 11 channels from 447.8625 MHz to 447.9875 MHz for wireless devices for a small output radio station and 32 channels from 917 MHz to 923.5 MHz for wireless devices such as RFID/USN, so that the air conditioner may communicate using the above channels.

Moreover, the air conditioner needs to use a wireless communication protocol and a routing algorithm of a sub-GHz band. The embodiments disclosed herein use a combination of a ZigBee type routing algorithm and Sub-GHz.

The embodiments disclosed herein may use the combination of one of a distance vector algorithm, a link state algorithm, and a complex scheme and the sub-giga band.

The above routing algorithm is as follows.

A distance vector algorithm for searching adjacent devices rarely uses a memory, has a high transmission success rate through routing, and easily searches another device upon path loss. However, communication traffic is high, and when a band width is insufficient, there is a limitation in transmitting/receiving data.

An address system based link state algorithm allows rapid response through an optimal path, may minimize use of a band width, and have a high transmission success rate. However, the address system based link state algorithm frequently uses a memory, and has a difficulty in finding another path upon path loss.

Accordingly, a complex scheme combining the above algorithms with each other has an average use rate of a memory and easily searches another path upon the path loss but has a low transmission success rate.

The indoor units are installed in a unit of a layer inside the building and the outdoor unit is generally installed. Accordingly, in the indoor unit shown in FIG. 6A, as a body case is buried inside a ceiling, the antenna 60 may be installed upward corresponding to an installation position of an outdoor unit not to expose an indoor space. Meanwhile, as shown in FIG. 6C, the outdoor unit may be installed at one side of a case.

Figure 7:
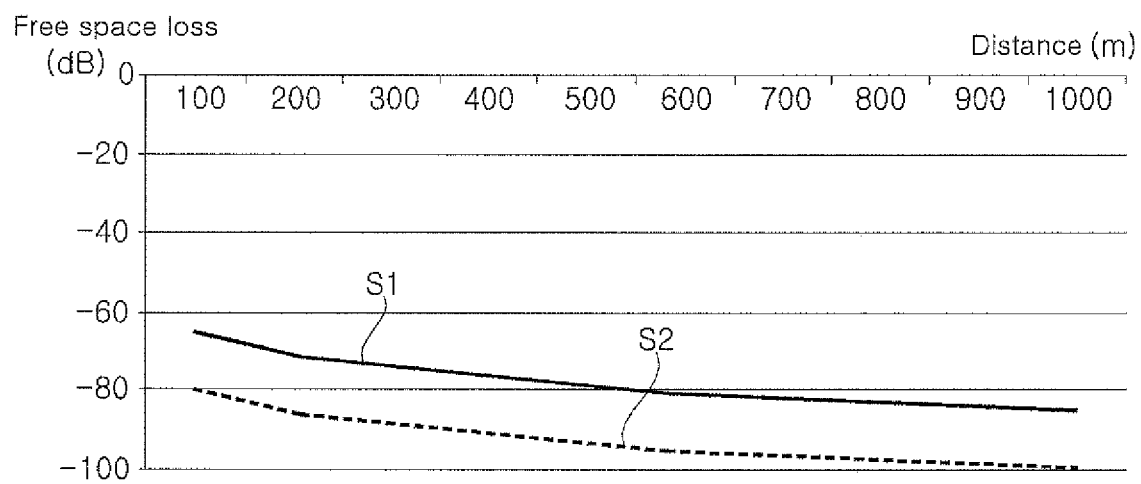
FIG. 7 is a graph illustrating a relationship between a distance and signal loss in a wireless communication in the air conditioner according to an embodiment.

FIG. 7 is a graph illustrating a relationship between a distance and signal loss in a wireless communication in the air conditioner according to an embodiment. As shown in FIG. 7, in a unit of an air conditioner for performing wireless communication, loss of a signal occurs according to a distance. FIG. 7 shows the degree of loss in a free space, which is calculated based on a center frequency f and a transmission/reception distance d for transmission.

Free space path loss is calculated by a following equation 1.

$$\text{Free space path loss} = 20 \log_{10} d + 20 \log_{10} f - 147.55 \quad \text{[Equation]}$$

When comparing a frequency A(S1) with a frequency B(S2), a distance is increased regardless of a frequency band so that signal loss occurs.

However, comparing a frequency A(S1) with a frequency B(S2), the frequency A(S1) loses as compared with the frequency B(S2) by about 15 dB to 18 db. In this case, the frequency A(S1) is a 400 MHz band signal and the frequency B(S2) is 2.4 GHz band signal.

Accordingly, the 400 MHz band frequency signal causes signal loss according to a distance less than that of the 2.4 GHz band frequency signal. As the air conditioner communicates in a wireless scheme using the 400 MHz band frequency signal, the air conditioner may communicate a long distance greater than a predetermined distance in the building including obstacles such as bottoms or floors and walls.

Figure 8:
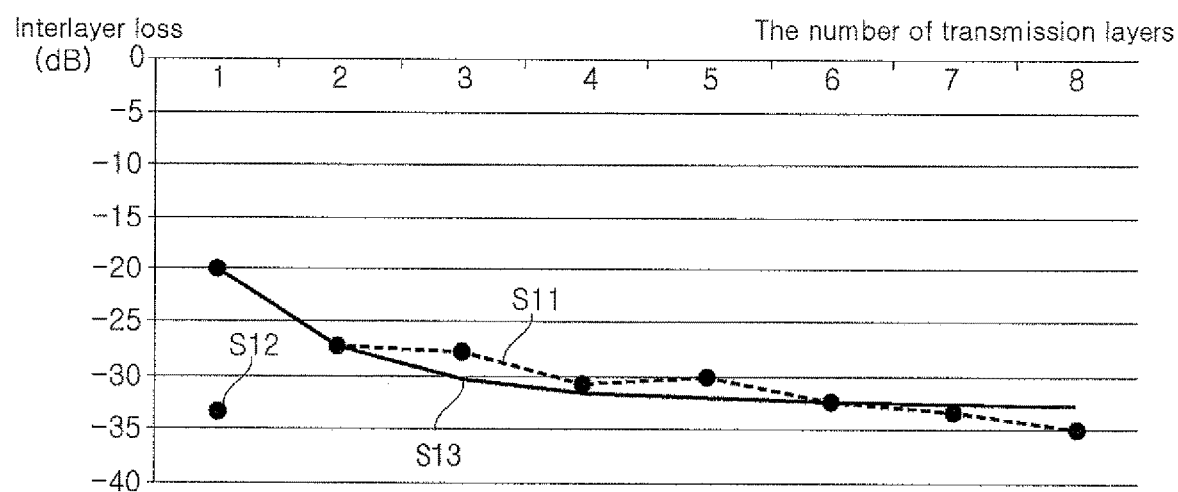
FIG. 8 is a graph illustrating a relationship between a number of transmission layers and inter-layer loss in a wireless communication in the air conditioner according to an embodiment.

FIG. 8 is a graph illustrating a relationship between the number of transmission layers and inter-layer loss in a wireless communication in the air conditioner according to an embodiment. As walls and bottoms or floors are included inside the building as described above, it is difficult to confirm whether communication is possible only by a distance of a free space.

According to research with respect to a transmission characteristic of a wireless signal according to obstacles (author: KIM heoung-keon, Korean fire science and engineering, 2009 fall conference), transmission path loss occurs according to materials of walls or bottoms as listed in a following table 1.

TABLE 1

| Materials | Characteristics | Thickness | Transmission loss A | Transmission loss B |
|---|---|---|---|---|
| Gypsum board | One gypsum board | 9.5 mm | 0.5 | 0.72 |
| Concrete wall | 200 mm interval arthropod | 150 mm | 19.15 | 25.19 |
| Concrete wall | 100 mm interval sucker | 200 mm | 24.06 | 34 |
| Tile brick | 190 mm brick and tile | 220 mm | 14.29 | 28.28 |
| Brick | 190 mm brick | 200 mm | 14.28 | 19.34 |

Interlayer loss of a signal may be calculated based on the number of transmission layers (nf), interlayer loss Lf, and wall transmission loss according to a wireless transmission characteristic with respect to obstacles such as walls or bottoms inside the building.

The interlayer loss is expressed by a following equation 2.

$$\text{Interlayer loss mod } eI = n_f^{(nf+2)/(nf+1)-b} L_f \quad \text{[Equation 2]}$$

That is, a plurality of walls and bottoms or floors are included in the building, each time the signal transmits one layer, loss occurs.

As listed in the table 1, in a case of a concrete wall (200 mm interval arthropod) used as a building material, when a thickness is 150 mm, transmission loss with respect to a frequency A is 19.15, and transmission loss with respect to a frequency B is 25.19. In different materials, the transmission loss with respect to a frequency A differs from the transmission loss with respect to a frequency B.

Further, as illustrated in FIG. 8 and a following table 2, as the number of transmission layers is increased, the interlayer loss occurs.

The interlayer loss may be calculated by subtracting transmission power and free space loss from reception strength. Frequency A(S11)(447 MHz: Lf=19.9, b=0.87), frequency B(S12)(2.4 GHz: Lf=28.8)

TABLE 2

| Frequency | The number of transmission layers | Reception strength | Transmission power | Free space loss | Interlayer loss |
|---|---|---|---|---|---|
| Frequency A | 1 | −57 | 10 | −47.1 | −19.9 |
| | 2 | −72 | 10 | −54.7 | −27.3 |
| | 3 | −77 | 10 | −59.1 | −27.9 |
| Frequency A | 4 | −83 | 10 | −62.2 | −30.8 |
| | 5 | −85 | 10 | −65.1 | −29.9 |
| | 6 | −90 | 10 | −67.4 | −32.6 |
| | 7 | −93 | 10 | −69.4 | −33.6 |
| | 8 | −96 | 10 | −71.2 | −34.8 |
| Frequency B | 1 | −65.9 | 10 | −47 | −28.8 |

FIG. 8 and table 2 illustrate a test result in a building configured using a reinforced concrete in a pillar, a barrage, and an outer wall as an iron frame and by using concrete and iron plat bottom as the bottom or floor.

In a case of the frequency B(S12), that is, 2.4 GHz, interlayer loss of −28.8 occurs to transmit one layer. In a case of the frequency B, transmission is possible with respect to only one layer but more layers are impossible.

In a case of the 400 MHZ band of the frequency A(S11), loss of −19.9 occurs to transmit one layer. As the number of transmission layers is increased, interlayer loss as listed in the table 2 occurs. The interlayer loss is possible but in a case of the frequency A, the signal may be transferred to the maximum 8 layers.

An average line S13 of interlayer loss with respect to the frequency A is reduced according to the number of transmission layers but the interlayer loss with respect to the frequency A. Accordingly, the air conditioner may communicate in a wireless scheme using the 400 MHz of the frequency A to allow communication to an eighth layer without the repeater. The air conditioners may be connected with each other using a repeater with respect to a building exceeding the eighth layer.

When using the frequency signal of a sub-giga band, the air conditioner may use different frequency signals according to countries. As described above, the air conditioner may communicate using the 400 MHz band or the 900 MHz band by taking into consideration a length of an antenna, a distance, and interlayer loss.

Unlicensed frequency bands by country will be described. The unlicensed frequency bands at North America or South America may include 902 MHz to 928 MHz (FCC Part 15.247). The unlicensed frequency bands at Europe may include 433 MHz, 915 MHz, and 863 MHz to 868 MHz (ETSIEN300220). The unlicensed frequency bands at Japan may include 920 MHz to 928 MHz (ARIB STD-T108). The unlicensed frequency bands at China may include 920 MHz. The unlicensed frequency bands at Korea may include 424 MHz to 447 MHz, and 917 MHz to 923.5 MHz (KC). The unlicensed frequency bands at India may include 867 MHz (G.S.R 564(E)). The unlicensed frequency bands at Australia may include 433, 915 MHz. The unlicensed frequency bands at South Africa may include 433 MHz and 915 MHz. The unlicensed frequency bands at the world may include 2.4 GHz and 5.725 GHz in common.

When the North America or the South America use 902 MHz to 928 MHz (FCC Part 15.247), the Europe uses 433 MHz, 915 MHz, and 863 MHz to 868 MHz (ETSIEN300220), the Japan uses 920 MHz to 928 MHz (ARIB STD-T108), the Korea uses 424 MHz to 447 MHz, and 917 MHz to 923.5 MHz (KC), the India uses 867 MHz (G.S.R 564(E)), and the world uses 2.4 GHz and 5.725 GHz in common, communication is possible at transmission speed greater than 50 kbps.

Accordingly, the air conditioner may communicate in a wireless scheme at a building having a plurality of layers using a frequency signal of 400 MHz band or a 900 Mhz band according to an installation country.

Embodiments disclosed herein provide an air conditioner which monitors and controls operations of a plurality of units in the air conditioner by exchanging data between the plurality of units.

Embodiments disclosed herein provide an air conditioner that may include a plurality of units including an outdoor unit and an indoor unit, the plurality of units being distributed at a plurality of layers or levels or stories in a building; and a control unit or controller configured to monitor and control the plurality of units. The control unit and the plurality of units may include a communication unit configured to transmit/receive data in a wireless communication unit, respectively, and the communication unit may transmit/receive the data using a sub-giga band frequency.

The communication unit may include an external omni-directional antenna. The communication unit may transmit/receive the data in a wireless scheme using a frequency set corresponding to a length of an antenna, signal loss according to a distance, and interlayer loss according to the number of transmission layers.

The communication unit may communicate using one frequency band from 170 MHz, 200 MHz, 300 MHz, 400 MHz, and 900 MHz. The communication unit may communicate using a 400 MHz band frequency. The communication unit may communicate using a 447 MHz band frequency. The communication unit may communicate using a 900 MHz band frequency. The communication unit may communicate using one frequency band signal of 400 MHz and 900 MHz corresponding to installation positions and installation countries of the plurality of units.

The communication unit may transmit/receive the data between the plurality of units distributed at eight layers or levels or stories among the plurality of layers. The communication unit may route a signal between the plurality of units using one of a distance vector algorithm, an address system based link state algorithm, or a combination of a distance vector and a link state.

The communication unit may communicate with one of a frequency band for transmitting data of a small output wireless device or an unlicensed frequency band. The plurality of units may be operated while configuring a group between units connected with each other by a refrigerant pipe.

In the air conditioner according to embodiments, a plurality of units may transmit/receive data in a wireless communication scheme so that an indoor unit and an indoor unit, and an indoor unit and an outdoor unit may directly communicate with each other in a wireless scheme, and the indoor unit may directly communicate with a control unit without through the outdoor unit. Further, as a separate communication line is not installed, installation and operation costs may be reduced. Communication may be stably performed in a high-rise building and may be performed regardless of obstacles by specifying a frequency of a signal used by taking into consideration obstacles and an installation in a building. Direct communication between units is possible so that effects in management and operation of the air conditioner are increased to improve the stability.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
    a plurality of units including an outdoor unit and an indoor unit, the plurality of units being distributed at a plurality of levels in a building; and
    a controller configured to monitor and control the plurality of units, wherein the controller and the plurality of units include a communication unit configured to transmit/receive data via a wireless communication unit, respectively, wherein the communication unit transmits/receive the data using a sub-giga band frequency, and wherein the communication unit transmits/receives the data in a wireless scheme using a frequency set corresponding to a length of an antenna, signal loss according to a distance, and interlayer loss according to a number of transmission layers.

2. The air conditioner of claim 1, wherein the communication unit comprises an external omnidirectional antenna.

3. The air conditioner of claim 1, wherein the communication unit communicates using one frequency band from 170 MHz, 200 MHz, 300 MHz, 400 MHz, and 900 MHz.

4. The air conditioner of claim 3, wherein the communication unit communicates using a 400 MHz band frequency.

5. The air conditioner of claim 4, wherein the communication unit communicates using a 447 MHz band frequency.

6. The air conditioner of claim 3, wherein the communication unit communicates using a 900 MHz band frequency.

7. The air conditioner of claim 3, wherein the communication unit communicates using one frequency band signal of 400 MHz and 900 MHz corresponding to installation positions and installation countries of the plurality of units.

8. The air conditioner of claim 1, wherein the communication unit transmits/receives the data between the plurality of units distributed at eight layers among the plurality of layers.

9. The air conditioner of claim 1, wherein the communication unit routes a signal between the plurality of units using one of a distance vector algorithm, an address system based link state algorithm, or a combination of a distance vector and a link state.

10. The air conditioner of claim 1, wherein the communication unit communicates with one of a frequency band for transmitting data of a small output wireless device or an unlicensed frequency band.

11. The air conditioner of claim 1, wherein the plurality of units is operated while configured as groups between units connected with each other by a refrigerant pipe.

12. The air conditioner of claim 1, wherein the communication unit comprises:
    a connector connected with the plurality of units or the controller;
    an antenna configured to transmit and receive a frequency signal configured in a wireless scheme;
    an RF matching circuit configured to match impedance of a signal transmitted to the antenna;
    a signal converter configured to convert transmitted/received data and to provide the converted data to the RF matching circuit;
    an antenna controller configured to process the transmitted/received data; and
    a state display configured to output a communication state.

13. The air conditioner of claim 12, wherein the antenna comprises a helical antenna.

14. An air conditioner for a multi-story building, comprising:
    a plurality of outdoor and indoor units, wherein the plurality of outdoor and indoor units are configured to be installed on different floor levels of the multi-story building including the roof and basement; and
    a controller configured to monitor and control the plurality of outdoor and indoor units, wherein the controller and the plurality of outdoor and indoor units each include a communication unit configured to transmit/receive data via a wireless communication, respectively, wherein the communication unit transmits/receives the data using a sub-giga band frequency, wherein the communication unit comprises an external omnidirectional antenna, and wherein the communication unit transmits/receives the data in a wireless scheme using a frequency set corresponding to a length of the antenna, signal loss according to a distance, and interlayer loss according to a number of transmission layers.

15. The air conditioner of claim 14, wherein the communication unit comprises:
    a connector connected with the plurality of units or the controller;
    the antenna configured to transmit and receive a frequency signal configured in a wireless scheme;
    an RF matching circuit configured to match impedance of a signal transmitted to the antenna;
    a signal converter configured to convert transmitted/received data and to provide the converted data to the RF matching circuit;
    an antenna controller configured to process the transmitted/received data; and
    a state display configured to output a communication state.

16. The air conditioner of claim 15, wherein the antenna comprises a helical antenna.

17. The air conditioner of claim 14, wherein the communication unit communicates with one of a frequency band for transmitting data of a small output wireless device or an unlicensed frequency band.

18. The air conditioner of claim 14, wherein the plurality of outdoor and indoor units is operated while configured as groups between units connected with each other by a refrigerant pipe.

* * * * *